(12) United States Patent
Lincoln et al.

(10) Patent No.: US 10,282,718 B1
(45) Date of Patent: May 7, 2019

(54) SELECTIVE INVOICE OPTION FOR BUSINESS CUSTOMERS IN AN E-COMMERCE APPLICATION

(71) Applicant: Staples, Inc., Framingham, MA (US)

(72) Inventors: Matthew Lincoln, Chicago, IL (US); Faisal Masud, Boston, MA (US); Alison Gaddis, Lincolnshire, IL (US)

(73) Assignee: Staples, Inc., Framingham, MA (US)

( * ) Notice: Subject to any disclaimer, the term of this patent is extended or adjusted under 35 U.S.C. 154(b) by 643 days.

(21) Appl. No.: 14/737,376

(22) Filed: Jun. 11, 2015

(51) Int. Cl.
*G06Q 20/12* (2012.01)
*G06Q 30/06* (2012.01)
*G06Q 20/14* (2012.01)
*G06Q 40/02* (2012.01)

(52) U.S. Cl.
CPC .............. *G06Q 20/12* (2013.01); *G06Q 20/14* (2013.01); *G06Q 30/0637* (2013.01); *G06Q 40/025* (2013.01)

(58) Field of Classification Search
CPC .... G06Q 20/12; G06Q 20/4016; G06Q 30/06; G06Q 20/20
USPC ....... 705/26.8, 26.1, 26.7, 44, 21, 14.39, 64; 235/381
See application file for complete search history.

(56) References Cited

U.S. PATENT DOCUMENTS

| | | | |
|---|---|---|---|
| 5,960,411 A | 9/1999 | Hartman et al. | |
| 7,006,989 B2 | 2/2006 | Bezos et al. | |
| 7,222,087 B1 | 5/2007 | Bezos et al. | |
| 7,792,705 B2 | 9/2010 | Bezos et al. | |
| 8,175,928 B2 * | 5/2012 | Klinger | G06Q 30/02 705/26.35 |
| 8,341,036 B2 | 12/2012 | Hartman et al. | |
| 8,571,937 B2 * | 10/2013 | Rose | G06Q 20/12 340/506 |
| 2002/0052841 A1 * | 5/2002 | Guthrie | G06Q 20/04 705/40 |
| 2003/0220841 A1 | 11/2003 | Maritzen | |
| 2008/0249938 A1 * | 10/2008 | Drake-Stoker | G06Q 20/12 705/44 |
| 2010/0153265 A1 | 6/2010 | Hershfield et al. | |
| 2012/0233021 A1 * | 9/2012 | Ehmann | G06Q 20/02 705/26.41 |
| 2013/0085896 A1 | 4/2013 | Hartman | |
| 2013/0085938 A1 * | 4/2013 | Stone | G06Q 40/02 705/41 |
| 2013/0346302 A1 | 12/2013 | Purves et al. | |

(Continued)

*Primary Examiner* — Vanel Frenel
(74) *Attorney, Agent, or Firm* — Patent Law Works LLP

(57) ABSTRACT

Technology for selectively providing an invoice payment option in an e-commerce application is described. In an example embodiment, a method selectively determines to activate the invoice payment option for the business customer in a graphical user interface associated with the e-commerce application based on the status of the invoice account of the business customer and a determination that the one or more items in the virtual shopping cart are approved for the invoice payment option. The method generates the graphical user interface including the invoice payment option and the summary of the virtual shopping cart and provides providing the graphical user interface including the invoice payment option and the summary of the virtual shopping cart for presentation on the client device associated with the business account of the business customer.

16 Claims, 9 Drawing Sheets

(56) References Cited

U.S. PATENT DOCUMENTS

| | | | | |
|---|---|---|---|---|
| 2014/0040180 A1* | 2/2014 | Ruhl | ............... | G06F 17/3089 |
| | | | | 706/52 |
| 2014/0101039 A1* | 4/2014 | Oskolkov | ............ | G06Q 10/10 |
| | | | | 705/40 |
| 2014/0249916 A1* | 9/2014 | Verhaeghe | ............ | G06Q 40/12 |
| | | | | 705/14.51 |
| 2015/0112836 A1* | 4/2015 | Godsey | ............ | G06Q 30/0613 |
| | | | | 705/26.41 |
| 2015/0248664 A1* | 9/2015 | Makhdumi | ........ | G06Q 20/3274 |
| | | | | 235/380 |

* cited by examiner

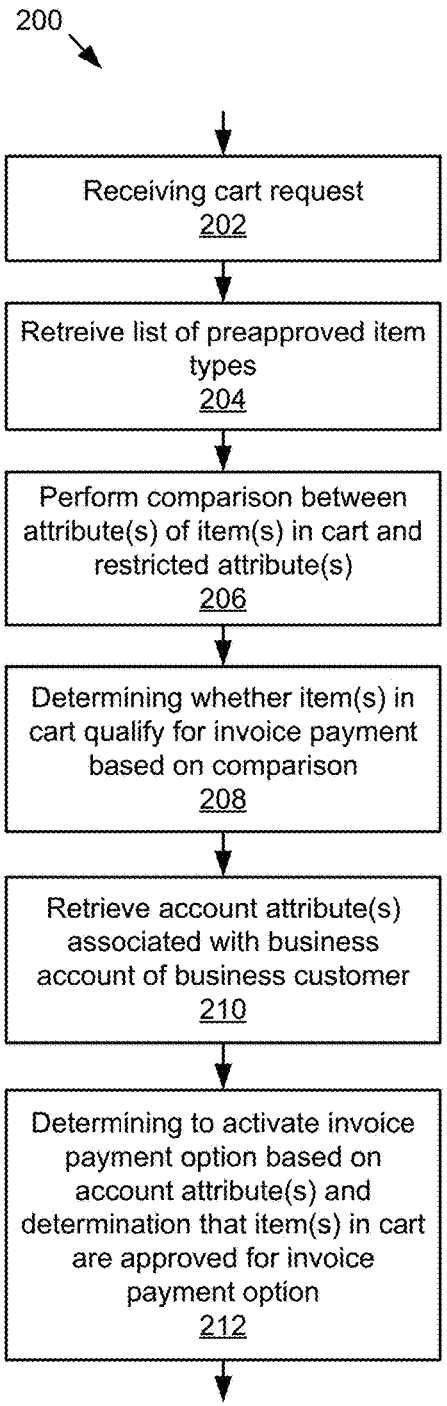
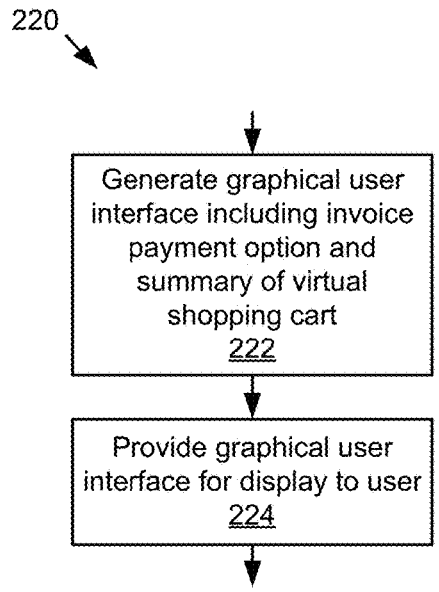
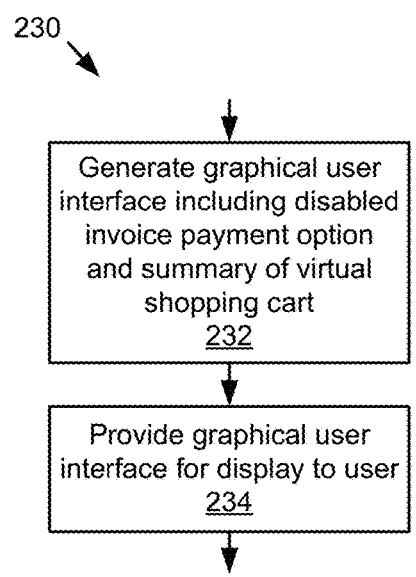
Figure 2A
Figure 2B
Figure 2C

Start the new year with savings. $20 off your order.

Need Help    1-800-555-1188    Chat    Quill Ideas                                Track Order ACME      ↻ Reorder First    ▦ Order by Item #    WELCOME TOM      CHECKOUT
                                                  My Account ∨      $47.28
          [ All ∨            ] 🔍                 Fast Free Shipping.   🏷 My Deals∨
                                                  Every Order Every Day Products ∨    INK & TONER ∨    COFFEE | SNACKS ∨    CLEANING ∨    SERVICES ∨    HEALTHCARE ∨

Please Check Cart Contents. Items you place in your Shopping Cart from a previous visit to .com have been added to cart.

My Shopping Cart

FREE shipping on this order.*

[ Continue Shopping ]  [ Save as list ]                              [ PROCEED TO CHECKOUT ]

Expected delivery (2 items): 1 to 2 Business Days FAST Delivery!

| | 3M Lint Roller | Qty: [1] $3.29 | $3.29 |
|---|---|---|---|
| Item #901-35R302 Model #ITTT-336R30 | Add to My List \| Remove | Each Update | |

| | Dymo White Multi-purpose Labels | Buy more&save! See Details+ Qty: [1] $43.99 | $43.99 |
|---|---|---|---|
| Item #901-30336 Model #30334 | Add to My List \| Remove | Box Update | |

[ UPDATE TOTALS ]

Subtotal:                                                              $47.28
Shipping:                                                                Free
Handling:                                                                Free
Estimated Tax:                                                          $3.55
Total:                                                            $50.83

Coupons and any additional shipping charges may be applied at checkout

[ CONTINUE SHOPPING ]  [ SAVE AS LIST ]   324 ⌐  [ PROCEED TO CHECKOUT ]
                                              OR
                          Submit Order now and we'll Invoice you
                  314 ↘
                      Ship To: [ 100 Yellow Road Parkway, Little Town, I ∨ ]
                      Invoice To: [ ~~100 Yellow Road Parkway, Little Town~~ ∨ ] ⌐ 318
                                              320 ⌐ [ ~~SUBMIT ORDER NOW~~ ]

322 ⌐ *This Account does not qualify for invoicing. Please choose another
               invoice address or proceed to checkout to pay by credit card.*

Start the new year with savings. $20 off your order.

Need Help   1-800-555-1186   Chat   Quill Ideas                                           Track Order ACME          ↻ Reorder First    ||||| Order by Item #    WELCOME TOM        CHECKOUT
                                                          My Account ∨        $47.28
              All ∨ [              ] 🔍   Fast Free Shipping.      🏷 My Deals∨
                                          Every Order Every Day Products ∨   INK & TONER ∨   COFFEE | SNACKS ∨   CLEANING ∨   SERVICES ∨   HEALTHCARE ∨

Your order has been submitted.                              502
RECAP NUMBER:              56447757
ORDER DATE:                01/06/2015 14:09:27 PM EST
ORDER CONFIRMATION will be sent to:   tom.banana@businessx.com

Billing Information              Delivery Information
Tom Sanders                          Business X
Business X                           Tom Sanders
100 YellowRoad Parkway   504         100 YellowRoad Parkway
Little Town, IL 60069                Little Town, IL 60069
Payment Method:
Invoice ACME Account

Expected delivery (2 items): 1 to 2 Business Days FAST Delivery!

| Order Details | Quantity | Price | Total |
|---|---|---|---|
| 3M Lint Roller<br>Item #901-35R302 | 1 | $3.29 | $3.29 |
| Dymo White Multi-purpose Labels<br>Item #901-30336 | 1 | $43.99 | $43.99 |

Subtotal:          $47.28
                           Shipping:                Free
                           Handling:                Free
                           Estimated Tax:          $3.55
                           Total:             $50.83

[ Back to ACME ]  [ Save as list ]

SELECTIVE INVOICE OPTION FOR BUSINESS CUSTOMERS IN AN E-COMMERCE APPLICATION

BACKGROUND

The present specification generally relates to electronic commerce and order processing.

The use of the internet to promote and sell products has proliferated in recent years to the point where it has become a significant portion of retail sales. While considerable focus by prominent online retailers has been placed on optimizing the sales process for retail customers, less innovation has occurred in business-to-business (B2B) sales. For example, in U.S. Pat. No. 5,960,411 to Hartman (U.S. '411), an approach is described that provides single-action ordering to customers independent of the shopping cart ordering component. The single-action ordering method in U.S. '411 displays the minimal amount of purchaser-specific order information sufficient to indicate to the purchaser whether the correct information is being used (e.g., which credit card is being used) to immediately place the order without having to go through the checkout process.

However, the single-action functionality in U.S. '411 requires the user to set up a preferred account in advance so that account can automatically be retrieved for single-action ordering from the item page, and does not give the user flexibility to select from a list of options which form of payment the customer would prefer to use, even in an expedited sales funnel, which is disadvantageous for a purchaser employed by a business to purchase various different products for different internal groups, and thus may be required to use different forms of payment or accounts depending on the which group the products are being purchased for. Additionally, among other deficiencies, existing solutions such as U.S. '411 are unable to dynamically assess at purchase time on an e-commerce platform the size, type, and/or credit-worthiness of a business, and/or the nature of products being ordered, to selectively determine the payment options to offer business.

What has long since been needed is an B2B e-commerce platform that provides a reduced ordering process that eliminates unnecessary steps while fulfilling the payment requirements of business customers.

SUMMARY

According to one innovative aspect of the subject matter described in this disclosure, an example method, implemented using the one or more computing devices, such as client and/or server devices, may receive a cart request associated with a client device authenticated using a user profile of a business customer on an e-commerce application. The cart request may request a summary of a virtual shopping cart including one or more items added to the virtual shopping cart by the business customer using the e-commerce application. Responsive to receiving the cart request, the method may retrieve from an item database item data describing a set of one or more attributes for each of the one or more items in the virtual shopping cart, perform a comparison between the set of attributes of each of the one or more items in the virtual shopping cart and a set of restricted attributes, and determine whether the one or more items in the virtual shopping cart qualify for the invoice payment option based on the comparison.

The method may retrieve account attribute(s) associated with the business account of the business customer from an account database and determine to activate the invoice payment option for the business customer in a graphical user interface including the summary of the virtual shopping cart based on the account attribute(s) and a determination that the one or more items in the virtual shopping cart are qualified for the invoice payment option.

As an example, as a business attribute, the method may retrieve from the account database account data including a credit status of a business account of the business customer and an available amount of credit in the business account of the business customer and determine to activate the invoice payment option for the business customer in a graphical user interface associated with the e-commerce application based on the credit status of the business account and the determination that the one or more items in the virtual shopping cart qualify for the invoice payment option.

Numerous additional and/or alternative features are also described herein, as well as other innovative aspects, such as but not limited to corresponding systems, methods, apparatus, and computer program products.

The technology described herein bears numerous advantages including enabling B2B websites or other services that enable invoicing to allow customers to invoice directly from the shopping cart page or item page and enabling a business customer to submit their order without having to make a call to a call center or visit a physical store. Instead, the business customer (represented by the user) can select an invoice payment option selectively included in the graphical user interface for to customer to order the items. This latter benefit can reduce operating overhead of the B2B e-commerce platform by reducing call volume and complaints.

Additionally or alternatively, the technology can selectively determine in real-time, and in some cases prior to the checkout page (thus reducing the steps needed to complete the order), whether the invoice payment option should be made unavailable based on certain criteria to prevent customers associated with business accounts that do not meet the requirements for invoice payment options from using that option. This can save the customer time needed to ordering the items, can reduce customer frustration that can result from using the incorrect payment option, and also reduce the time and resources spent by account managers to rectify incorrectly selected payment options. The technology is also configurable to consider new and/or unique criteria that may apply to certain types of businesses to selectively determine if those businesses and/or the items (e.g., products) being ordered by them qualify for the invoice payment option.

The technology can use a wide range of criteria to dynamically determine whether to allow invoicing to a business account. Example criteria include locale, credit standing, whether the user is associated with a business, spend rate, employee size of the business, type of the business, type of items being ordered, shipping method, etc.

By way of further example, in a first scenario, the user may submit an order and the technology may determine that because: 1) no trigger threshold was triggered for bad credit, 2) no restricted item categories and shipping requirements were triggered, and 3) the business associated with user has approved credit line determined by company type and business size, that the interface button for submitting the order using invoicing should be activated.

In a second example scenario, the user may submit an order and the technology may determine that because: 1) the trigger threshold was for bad credit, or 2) restricted item categories and shipping requirements were triggered, even though the user is associated with a business that has approved credit line determined by company type and business size, that the interface button for submitting the order using invoicing should be deactivated.

In a third example, the user may submit an order and the technology may determine that even though 1) no trigger threshold was triggered for bad credit, and 2) the user is associated with a business that has approved credit line determined by company type and business size, because restricted item categories and shipping requirements were triggered, that the interface button for submitting the order using invoicing should be deactivated.

The features and advantages described herein are not all-inclusive and many additional features and advantages will be apparent to one or ordinary skill in the art in view of the figures and description. Also, it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

FIGS. 2A-2C are flowcharts of example methods for selectively providing an invoice payment option in an e-commerce application.

FIGS. 3A and 3B are graphical representations of example graphical user interfaces selectively providing an invoice payment option.

FIG. 5 is a graphical representation of an example graphical user interface of a confirmation page that confirms an order submission using invoice payment option.

FIG. 6 is a graphical representation of another example graphical user interface selectively providing an invoice payment option.

DETAILED DESCRIPTION

The technology disclosed herein includes computing systems, methods, user interfaces, data, and other aspects that selectively provide an invoice payment option to approved customers of an e-commerce application, such as business customers. The e-commerce application provides those customers with a virtual marketplace (e.g., B2B) for purchasing items from the merchant/owner associated with the e-commerce application. An item may include a virtual or physical product or service. In the examples discussed herein, the items include physical products that the business customers may need for operating their businesses, although other types of items are also contemplated and encompassed by the scope of this disclosure.

Figure 1A:
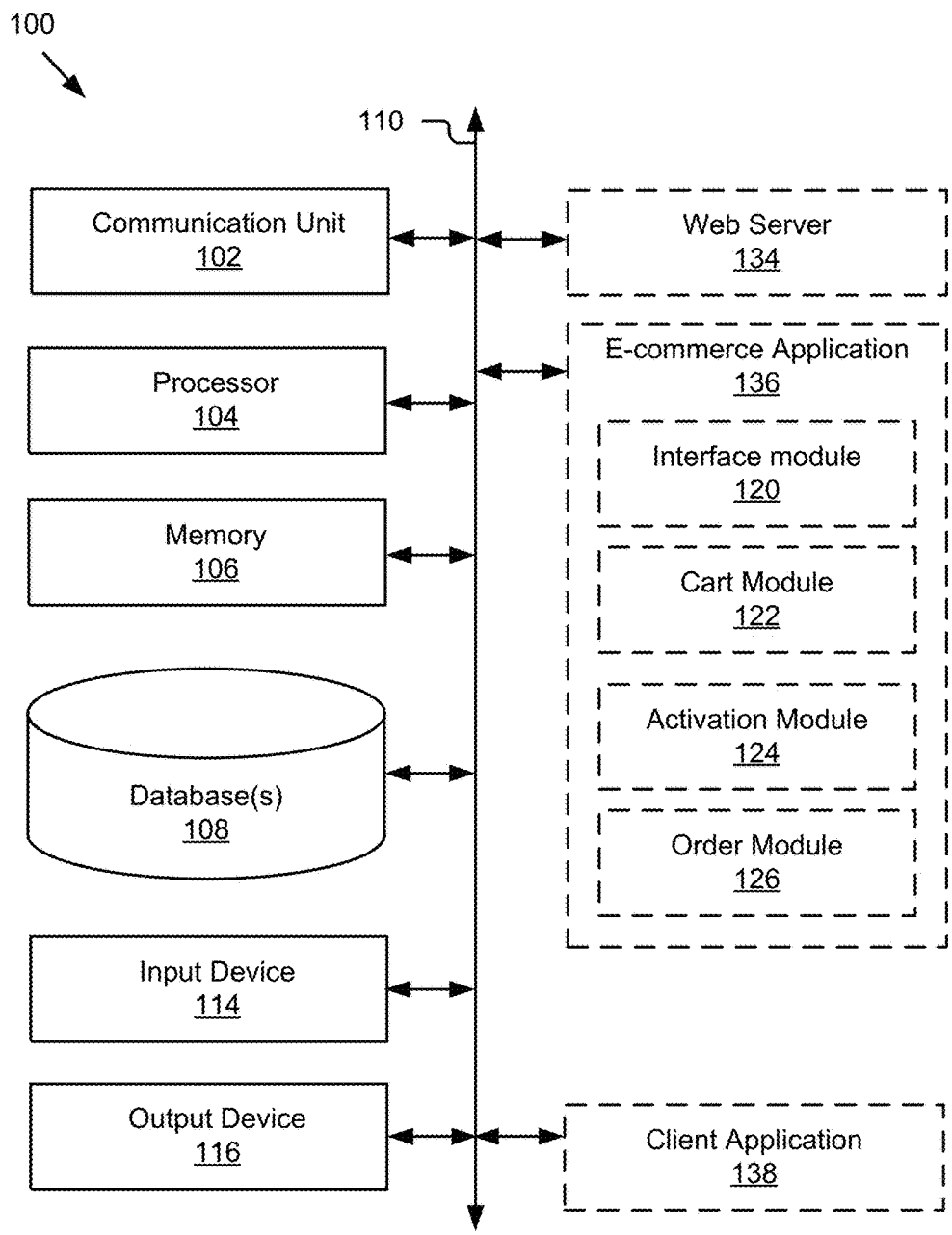
FIG. 1A is a block diagram illustrating an example computing system.
Figure 7:
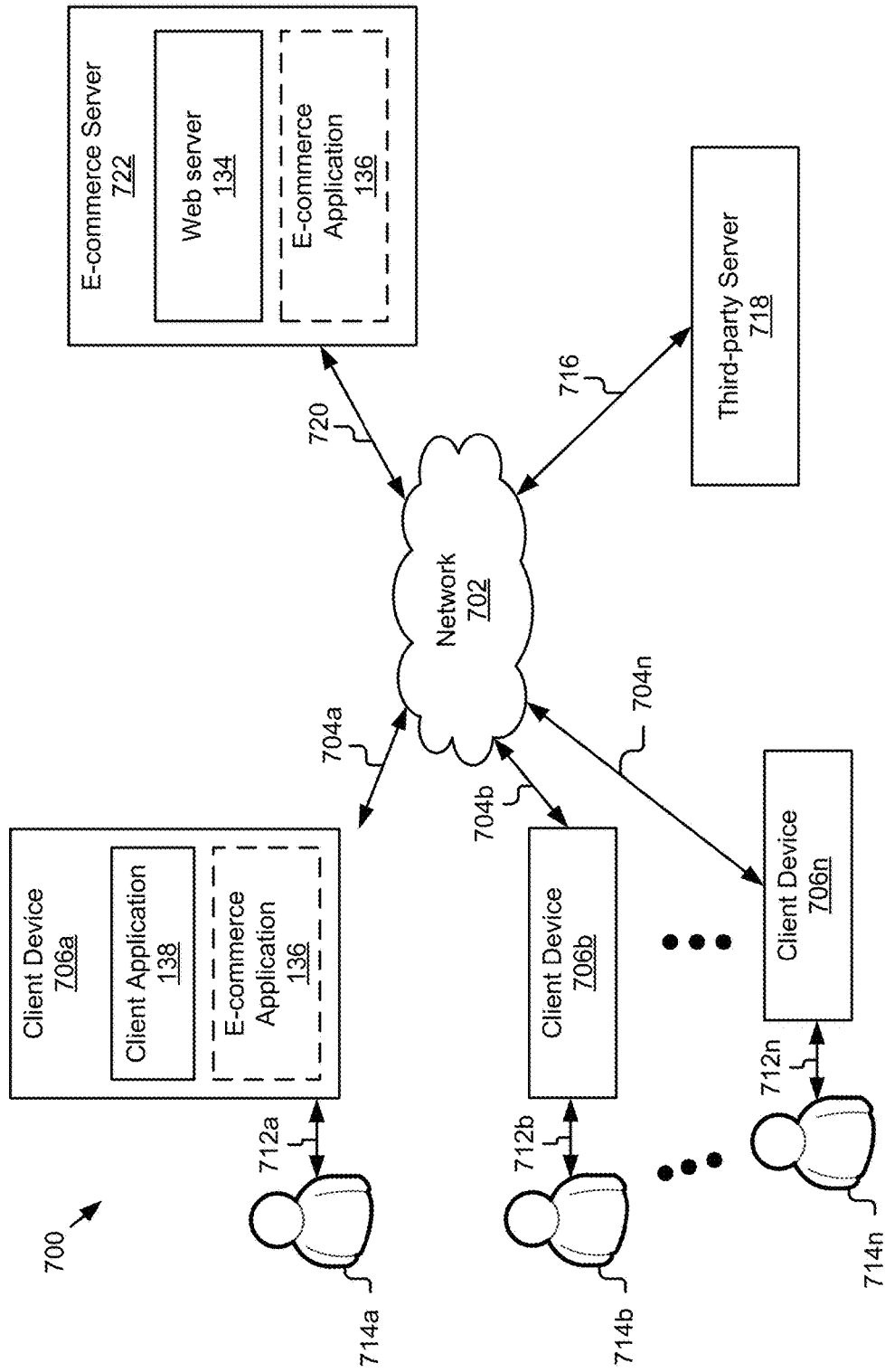
FIG. 7 is a block diagram of an example system for implementing a dynamic discount optimization model.

An example computing system 100 of the technology is depicted in FIG. 1A. This computing system 100 may represent the computer architecture of a client device 706, a third-party server 718, and/or an e-commerce server 722, as depicted in FIG. 7, and may include different components depending on the implementation being represented.

As depicted in FIG. 1A, the computing system 100 may include one or more of a web server 74, an e-commerce application 136, and a client application 138, depending on the configuration. For instance, with reference to FIGS. 1A and 7, a client device 706 may include one or more of the client application 138, the e-commerce application 136, and/or components thereof, although it should be understood that other configurations are also possible, such as configurations where the client application 138 and the e-commerce application 136 are combined into a single entity or further distributed into additional components. The e-commerce server 722 may include the web server 134, the e-commerce application 136, and/or components thereof, the database(s) 108, etc., although other configurations are also possible and contemplated.

The client devices 706 may also store and/or operate other software such as a client application 138, an e-commerce application 136, operating system, other applications, etc., that are configured to interact with the e-commerce server 722 via the network 702.

The client device 706 includes one or more computing devices having data processing and communication capabilities. The client device 706 may couple to and communicate with other client devices 706 and the other entities of the system 700 via the network 702 using a wireless and/or wired connection. Examples of client devices 706 may include mobile phones, tablets, laptops, desktops, netbooks, server appliances, servers, virtual machines, TVs, etc. The system 700 may include any number of client devices 706, including client devices of the same or different type.

The web server 134 includes computer logic executable by the processor 104 to receive, process, and respond to content requests. The web server 134 may include an HTTP server, a REST (representational state transfer) service, or other suitable server type. The web server 134 may receive content requests (e.g., page requests, order requests, other requests (e.g., HTTP), etc.) from client devices 706, cooperate with the e-commerce application 136 to determine the content, retrieve and incorporate data from the database(s) 108, format the content, and provide the content to the client devices. In some instances, the web server 134 may format the content using a web language and provide the content to a corresponding client application 138 for processing and/or rendering to the user for display, although other variations are also possible.

The web server 134 may be coupled to the database(s) 108 to store retrieve, and/or manipulate data stored therein and may be coupled to the e-commerce application 136 to facilitate its operations. For example, the web server 134 may allow a user on a client device 706 to communicate with the e-commerce application 136.

The e-commerce application 136 includes computer logic executable by the processor 104 to provide an expedited e-commerce service/marketplace for business customers for various items, as discussed elsewhere herein. The e-commerce application 136 may store and provide access to item information (e.g., images, descriptions, categories, specifications, reviews, ratings, retailers, etc.) in the item data 142 in the database(s) 108. The e-commerce application 136 may also place and provide for order fulfillment for the items including order delivery status and item returns. For example, a user may place orders for and/or pay for items, such as office supplies, consumer electronics, other items, etc., ordered on an e-commerce marketplace using a client device 706.

The e-commerce application 136 may also receive, manage, analyze, store, and provide access to inventory, sales, account, and item data. The e-commerce application 136 may communicate with the web server 134 to facilitate its operations and may be coupled to the database(s) 108 to store retrieve, and/or manipulate data stored therein. For example, the e-commerce application 136 may retrieve item data from a third-party server 718 and store it in the item data 142.

In the depicted implementation, the e-commerce application 136 includes an interface module 120, a cart module 122, an activation module 124, and an order module 126, which are communicatively coupled to one another to send and/or receive data (e.g., signals, procedure calls, data, variables, etc.). In some embodiments, the interface module 120, cart module 122, the activation module 124, and/or the order module 126 are software including logic executable by the processor 104 to perform their respective acts, although in further embodiments one or more of the interface module 120, cart module 122, the activation module 124, and/or the order module 126 may be implemented in hardware (one or more application specific integrated circuits (ASICs) coupled to the bus 110 for cooperation and communication with the other components of the system 100; sets of instructions stored in one or more discrete memory devices (e.g., a PROM, FPROM, ROM) that are coupled to the bus 110 for cooperation and communication with the other components of the system 100; a combination thereof; etc.).

The client application 138 includes computer logic executable by the processor 104 on a client device 706 to provide for user interaction, receive user input, present information to the user via a display, and send data to and receive data from the other entities of the system 700 via the network 702. In some implementations, the client application 138 may generate and present user interfaces based at least in part on information received from the e-commerce application 136 and/or the web server 134 via the network 702. For example, a customer/user 714 may access a virtual cart page including an invoice payment option provided by the e-commerce server 722, complete the purchase of the items using the invoice payment option, view details about various items, add and/or remove items to the virtual cart, etc. In some implementations, the client application 138 includes a web browser and/or code operable therein, a customized client-side application (e.g., a dedicated mobile app), a combination of both, etc. Example interfaces that can be displayed by the client application 138 are shown in Figures.

The web server 134, the e-commerce application 136, and/or the client application 138 may require the user to authenticate using known web authentication protocols in order to determine if they have permission to invoice an order to a customer account, as discussed further herein.

As depicted, the computing system 100 may include a processor 104, a memory 106, a communication unit 102, an output device 116, an input device 114, and database(s) 108, which may be communicatively coupled by a communication bus 110. The computing system 100 depicted in FIG. 1A is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 100 may include various operating systems, sensors, additional processors, and other physical configurations. Although, for purposes of clarity, FIG. 1A only shows a single processor 104, memory 106, communication unit 102, etc., it should be understood that the computing system 100 may include a plurality of one or more of these components.

The processor 104 may execute software instructions by performing various input, logical, and/or mathematical operations. The processor 104 may have various computing architectures to method data signals including, for example, a complex instruction set computer (CISC) architecture, a reduced instruction set computer (RISC) architecture, and/or an architecture implementing a combination of instruction sets. The processor 104 may be physical and/or virtual, and may include a single core or plurality of processing units and/or cores. In some implementations, the processor 104 may be capable of generating and providing electronic display signals to a display device, supporting the display of images, capturing and transmitting images, performing complex tasks including various types of feature extraction and sampling, etc. In some implementations, the processor 104 may be coupled to the memory 106 via the bus 110 to access data and instructions therefrom and store data therein. The bus 110 may couple the processor 104 to the other components of the computing system 100 including, for example, the memory 106, the communication unit 102, the input device 114, the output device 116, and the database(s) 108.

The memory 106 may store and provide access to data to the other components of the computing system 100. The memory 106 may be included in a single computing device or a plurality of computing devices. In some implementations, the memory 106 may store instructions and/or data that may be executed by the processor 104. For example, the memory 106 may store one or more of a web server 134, an e-commerce application 136, a client application 138, and their respective components, depending on the configuration. The memory 106 is also capable of storing other instructions and data, including, for example, an operating system, hardware drivers, other software applications, databases, etc. The memory 106 may be coupled to the bus 110 for communication with the processor 104 and the other components of computing system 100.

The memory 106 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 104. In some implementations, the memory 106 may include one or more of volatile memory and non-volatile memory (e.g., RAM, ROM, hard disk, optical disk, etc.). It should be understood that the memory 106 may be a single device or may include multiple types of devices and configurations.

The bus 110 can include a communication bus for transferring data between components of a computing device or between computing devices, a network bus system including the network 702 or portions thereof, a processor mesh, a combination thereof, etc. In some implementations, the web server 134, e-commerce application 136, client application 138, and various other components operating on the computing device 100 (operating systems, device drivers, etc.) may cooperate and communicate via a communication mechanism included in or implemented in association with the bus 110. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 102 may include one or more interface devices (I/F) for wired and wireless connectivity among the components of the system 700. For instance, the communication unit 102 may include various types known connectivity and interface options. The communication unit 102 may be coupled to the other components of the computing system 100 via the bus 110. The communication unit 102 may be electronically communicatively coupled to the network 702 (e.g., wiredly, wirelessly, etc.). In some implementations, the communication unit 102 can link the processor 104 to the network 702, which may in turn be coupled to other processing systems. The communication unit 102 can provide other connections to the network 702 and to other entities of the system 700 using various standard communication protocols.

The input device 114 may include any device for inputting information into the computing system 100. In some implementations, the input device 114 may include one or more peripheral devices. For example, the input device 114 may include a keyboard, a pointing device, microphone, an image/video capture device (e.g., camera), a touch-screen display integrated with the output device 116, etc.

The output device 116 may be any device capable of outputting information from the computing system 100. The output device 116 may include one or more of a display (LCD, OLED, etc.), a printer, a 3D printer, a haptic device, audio reproduction device, touch-screen display, etc. In some implementations, the output device is a display which may display electronic images and data output by the computing system 100 for presentation to a user 106. In some implementations, the computing system 100 may include a graphics adapter (not shown) for rendering and outputting the images and data for presentation on output device 116. The graphics adapter (not shown) may be a separate processing device including a separate processor and memory (not shown) or may be integrated with the processor 104 and memory 106.

The database(s) are information source(s) for storing and providing access to data. The data stored by the database(s) 108 may organized and queried using various criteria including any type of data stored by them, such as a customer identifier, business identifier, order ID, IP address, rewards account number, item identifier, item attributes, item name, etc. The database(s) 108 may include file systems, data tables, documents, databases, or other organized collections of data. Examples of the types of data stored by the database(s) 108 may include invoice data 140, item data 142, business account data 144, purchase data 146, user profile data 148, etc., as discussed elsewhere herein, for example, in reference to FIG. 1B.

The components 134, 136, 138, and/or components thereof (e.g., 120, 122, 124, and/or 126), may be communicatively coupled by the bus 110 and/or the processor 104 to one another and/or the other components 102, 106, 108, 114, and 116 of the computing system 100. In some implementations, the components 134, 136, and/or 138 may include computer logic (e.g., software logic, hardware logic, etc.) executable by the processor 104 to provide their acts and/or functionality. In any of the foregoing implementations, these components 134, 136, and/or 138 may be adapted for cooperation and communication with the processor 104 and the other components of the computing system 100.

The database(s) 108 may be included in the computing system 100 or in another computing system and/or storage system distinct from but coupled to or accessible by the computing system 100. The database(s) 108 can include one or more non-transitory computer-readable mediums for storing the data. In some implementations, the database(s) 108 may be incorporated with the memory 106 or may be distinct therefrom. In some implementations, the database(s) 108 may store data associated with a database management system (DBMS) operable on the computing system 100. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

Figure 1B:
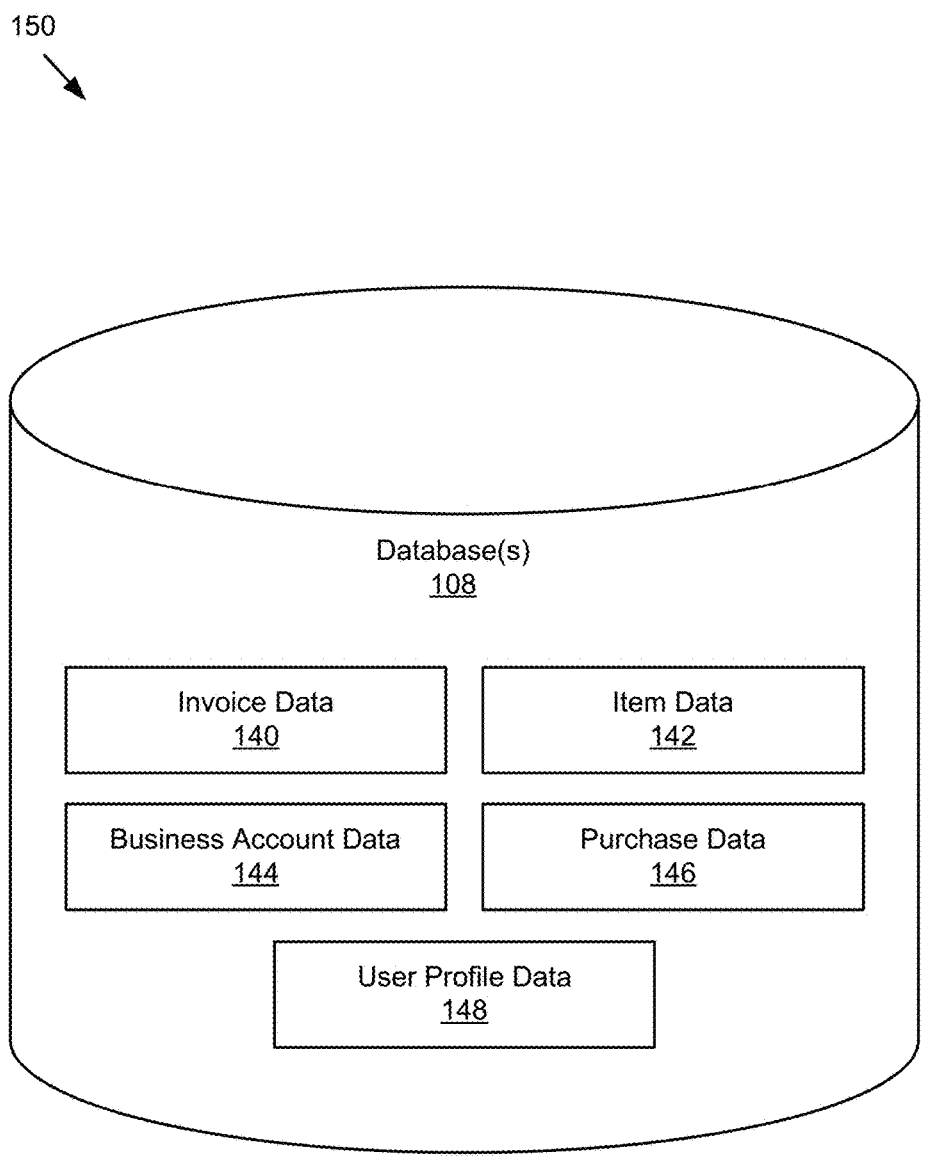
FIG. 1B is a block diagram illustrating example data stored in database(s).

FIG. 1B is a block diagram 150 of the database(s) 108, which are depicted as storing invoice data 140, item data 142, business account data 144, price data 145, and user profile data 148, although the database(s) 108 can store and provide access to other types of data. Each of these types of data may represent a corresponding database (e.g., an invoice database, an item database, an account database, a purchase database, and a user profile database).

The invoice data 140 includes records reflecting invoices send or to be sent to users/businesses that ordered items using invoice payment option. The invoice data 140 may be linked to other types of data in the databases 108, for example 142, 144, 146, and 148, such as the order records to which they correspond and the item records to which they correspond.

The item data 142 may include data and attributes concerning items available for ordering via the virtual marketplace embodied by the e-commerce application 136. For example, the data may reflect one or more products, services, product/service classes, categories, product hierarchies, etc. Examples of items include office supplies, electronics, digital products or services, furniture, consumables, clothing, and/or any other consumer or business products. The item data 142 includes a plurality of item records respectively describing items available via the e-commerce application 136. Each item record may describe the various aspects of the items. Each record may include one or more item attributes characterizing the item. Each record may also include unique item identifiers, names, descriptions, manufacturer info, specifications, photos, videos, reviews, ratings, categories, etc. for items.

The item data 140 may be correlated with the other types of data in the database(s) 108, for example 140, 144, 146, and 148. For instance, the purchase data 146 may reference items included in the order records, associate the items with various customers and/or businesses, etc. Similarly, the invoice records may reference the orders to which they correspond, which in turn may reference the items associated therewith.

The business account data 144 may include data pertaining to finance accounts associated with registered customers that purchase items using the virtual marketplace. Each account may be reflected by an account record that includes attributes associated with the accounts, such as a previous credit status, current credit status, credit line, length of service, founding day, sales, employee count, bill zip, average days till purchase (adtp) variance, adtp days, open invoice, average age, oldest past due, bad debt, previous bad debt, credit score (new account, mature account), account type, other applicable attributes discussed herein, etc.

In some embodiments, the e-commerce application 136 may include a credit module (not shown) included in the e-commerce application 136 may evaluate a credit score of a customer using the business account data 144 and/or other data. In computing the credit score, the e-commerce application 136 may consider and/or weight the following variables: location (e.g., zip+4), credit status, credit line, employee count, invoice sales, founding day, length of service, adtp variance, adtp days, open invoice(s) (whether one or more are outstanding), past due invoice(s), whether the account balance is over the credit line, whether the customer is required to pre-pay in order to use the instant invoicing option, the oldest open invoice, etc. The e-commerce application 136 may store and/or update the credit score routinely (at regular intervals), in real-time as the invoice payment option is being determined, as new data (e.g., updated variable values) are received and stored, etc. In some embodiments, the activation module 124 may interact with the credit module and/or data stored thereby to retrieve the credit score (e.g., as the credit status or part thereof) for use in determining whether the activate the invoice payment option for a given customer, as discussed further elsewhere herein.

The purchase data 146 may include data pertaining to past item purchases processed by the e-commerce application 136, such as the order records documenting the orders submitted, processed, and fulfilled by the system 700. The purchase data 146 may be updated dynamically in response to the orders being processed by the e-commerce application 136, periodically (e.g., hourly, daily, weekly, etc.), etc. The purchase data 146 may be correlated with the other types of data in the database(s) 108, for example 140, 142, 144, and 148. For instance, the invoice records may reference the account or order records to which they correspond, which in turn may reference the items associated therewith.

The user profile data 148 may include profiles for each of the users 714 of the system 700. The user profile data 148 may be correlated with the other types of data in the database(s) 108, for example 140, 142, 144, and 146. A given user's profile may include the user's user account and attributes describing the user. The user account may include information associated with the user's identity on the services provided by the e-commerce server 722, such as a username, password, preference data, payment information, etc. The attributes may characterize the user's preferences and/or identity. User attributes may be based on information provided by the user or information learned from user interactions with the system 700.

Examples of user attributes include biographical information (e.g., name, address, etc.), payment information (e.g., credit card information, etc.), an e-mail address, IP address, demographics data, whether a user is associated with an entity (e.g., business), and if so the unique identifier for that entity (as reflected by the account data), location data, user id, rewards account number, items of interest or potentially of interest to the user, devices registered to the user, etc.

The data 140, 142, 144, 146, and 148 may be accessible by other components of the system 700. For example, the e-commerce application 136, web server 134, and/or client application 138 may retrieve, analyze, processes, and/or render for display any of the above data in carrying out the acts and/or functionality discussed herein.

The interface module 120 is executable to receive instructions by the user submitted via the graphical user interfaces presented by the client device 706 and generate corresponding requests for information from the other components of the system, such as the other components of the e-commerce application 108. In some embodiments, the interface module 120 may be included in and/or executed by, at least in part, the client application 138, whereas in other embodiments, the interface module 120 may be a separate component configured to interact with the other components of the system 700.

The methods 200, 220, and 230 depicted in FIGS. 2A-2C, respectively are now described. However, it should be understood that the methods 200, 220, and 230 are provided by way of example, and that variations and combinations of these methods, as well as other methods, are contemplated. For example, in some embodiments, at least a portion of one or more of the methods 200, 220, and 230 represent various segments of one or more larger methods and may be concatenated or various steps of these methods may be combined to produce other methods which are encompassed by the present disclosure. Additionally, it should be understood that various operations in the methods 200, 220, and 230 may in some cases be iterative, and thus repeated as many times as necessary generate the results described herein. Further the ordering of the operations in the methods 200, 220, and 230 is provided by way of example and it should be understood that various operations may occur earlier and/or later in the method without departing from the scope thereof.

FIG. 2 is a flowchart of an example method 200 for selectively providing an invoice payment option in an e-commerce application. In block, 202 the method 200 receives a cart request associated with a client device authenticated using a user profile of a business customer on an e-commerce application. The cart request requests a summary of a virtual shopping cart including one or more items added to the virtual shopping cart by the business customer using the e-commerce application. For example, the user (representing the business customer) using the client application 138 may browse different items available for purchase via the virtual marketplace embodied by the e-commerce application 136 may select various items for purchase and add them to a virtual shopping cart. These selections may be received by the interface module 120 and provided to the cart module 122 for inclusion in a virtual shopping cart. The cart module 122 may manage the items in the virtual shopping cart and provide user-selectable option(s) to purchase the items in the cart.

While the methods and interfaces provided herein are described within the context of a cart, it should be understood that the methods and interfaces may be applied to an item page, which allows the user to instantly invoice the product from that page using the techniques described herein. Thus, instead of the cart request, the method 220 may receive an item page request instead of a cart request and respond in a manner substantially similar. In this example, if the invoice payment option is activated, the item page may include a user-selectable submit order element that allows the user to instantly invoice the order without having to visit the shopping cart or the checkout page. In further embodiments, instead of or in addition to the cart and item pages, the methods may be applied to a checkout page or other suitable pages from which a user could submit an order for an item.

In a distributed model, the instance of the e-commerce application 136 configured to handle client-side operations may, in cooperation with the client application 138 being used by the user, generate and transmit the cart request via a computer network, such as the computer network 702 depicted in FIG. 7, to the e-commerce server 722. The web server 134 may receive, process, and respond to the cart request in cooperation with the server-side instance of the e-commerce application 136, as discussed elsewhere herein. For instance, the web server 134 may parse the cart request for information about the items in the cart and/or the user submitting the request and relay that information to and/or store the information for retrieval by the cart module 122. In further embodiments, the cart module 122 residing on the e-commerce server 722 and/or the client device 706 may perform these acts using data stored on the e-commerce server 722, the client device 706, and/or another device of the system 700, such as the third-party server 718.

In block 204, responsive to the receipt of the cart request, the method 200 may retrieve data describing a set of one or more attributes for each of the one or more items in the virtual shopping cart from an item database. In block 206, the method 200 may perform a comparison between the set of attributes of each of the one or more items in the virtual shopping cart and a set of restricted attributes and determine in block 208 whether the one or more items in the virtual shopping cart qualify for the invoice payment option based on the comparison. In some embodiments, the activation module 124 may perform these acts responsive to receiving a signal from the cart module 122 or the web server 134.

The set of restricted attributes may be stored in memory, such as the memory 106, and retrievable by the activation module 124. The set of restricted attributes may include item-related attributes such categories of items that are not available for the invoice payment option, item prices that do not qualify for the invoice payment option, shipping requirements that do not qualify for the invoice payment option, and/or other suitable attributes for restricting the availability of the invoice payment option, etc.

The set of attributes for an item may include attributes that correspond with the attributes in the set of restricted attributes, such as an item category, an item price, shipping requirements for shipping the item, etc.

By way of further illustration, in some embodiments, the attribute data may include shipping data. The shipping data may have one or more shipping criteria for each item in the virtual shopping cart, and (in performing a comparison between the set of attributes of each of the item(s) in the virtual shopping cart and the set of restricted attributes) the cart module 122 may signal the activation module 124 to compare the shipping criteria of each item in the virtual shopping cart to one or more restricted shipping options included in the set of restricted attributes. Based on the comparison, the activation module 124 may determine that none of the item(s) in the virtual shopping cart require any of the restricted shipping options, and responsive to determining this, the activation module 124 may determine that the item(s) in the virtual shopping cart (or a subset thereof) qualify for the invoice payment option based on the comparison.

Alternatively, based on the comparison, the activation module 124 may determine that an item in the virtual shopping cart requires a restricted shipping option, and may determine that at least that item does not qualify for the invoice payment option (and signal the cart module 122 to disable it) or, if there are more items in the cart, the cart module 122 may restrict the entire cart from the invoice payment option or just the restricted item and provide the invoice payment option for the other items. For instance, the virtual shopping cart may include an desk item object representing a desk that requires the item be delivered by LTL freight and the customer accept tailgate delivery, which costs more than conventional parcel services (e.g., UPS, FedEx, USPS, etc.) used to ship smaller, more manageable items, such as office supplies (e.g., paperclips, staples, ink, etc.) or electronics (e.g., laptop, tablet, camera, etc.), or whether the customer is located outside of a given region (e.g., the continental U.S., etc.) or requires a service call, which similarly drives up the cost of fulfillment. The invoice payment option may be tied to a free shipping provision for items ordered using that payment method except those requiring this more expensive, less conventional shipping methods (e.g., tailgate, international, etc.). As such, the set of restricted attributes may be defined to restrict tailgate delivery and the other less conventional methods, and upon comparing the set of restricted attributes to the shipping criteria of the desk item object, the activation module 124 may determine that the desk item object does not qualify for the invoice payment option and may signal the cart module 122 to disable the invoice payment option, which may include excluding the invoice payment option from the graphical user interface (e.g., embodying the virtual shopping cart) or rendering the invoice payment option unselectable in that graphical user interface.

In another example, the attribute data may include category data. The category data may have a category for each of the item(s) in the virtual shopping cart and (in performing the comparison between the set of attributes of each of the one or more items in the virtual shopping cart and the set of restricted attributes), the cart module 122 may signal the activation module 124 to compare the category of each item in the virtual shopping cart to a list of restricted categories. Based on this comparison, the activation module 124 may determine that none of the item(s) belong to categories included in the list of restricted categories, and responsive to determining this, the activation module 124 may determine that the item(s) in the virtual shopping cart (or a subset thereof) qualify for the invoice payment option based on the comparison.

In further examples, both the shipping data and the category data, and/or other data, can be compared to the set of restricted attributes to selectively restrict and/or qualify the invoice payment option for some or all of the items in the virtual shopping cart.

In block 210, the method 200 retrieves account attribute(s) associated with business account of business customer, and in block 212, determines to activate invoice payment option based on account attribute(s) and determination that item(s) in cart are approved for invoice payment option. The account attribute(s) may, for example, include a credit status, a length of time the business account has existed, an amount of the line of credit, how much credit is available, employee count of the business, a size of the business, a type of the business, a location of the business, the age of the business, and/or other applicable attributes discussed herein, etc.

In some embodiments, the activation module 124 may use a single attribute, all the attributes, or various combinations of these attributes to determine whether to activate the invoice payment option. This is advantageous as the activation module 124 enables the B2B e-commerce service embodied by the e-commerce application 136 to filter out users who are using the invoice payment option for personal purchases; filter out businesses that do not meet certain spending thresholds, and thus do not justify the costs to the owner of the e-commerce service in offering and maintaining the invoice payment option; or filter out businesses that exceed certain spending thresholds, and thus increasing the possibility of a default by that business on the invoiced amount(s). These benefits are provided by way of example and should not be considered exclusive.

By way of further example, in block 210, the activation module 124 may in some embodiments additionally or alternatively retrieve from an account database business account data including a credit status of a business account of the business customer and an available amount of credit in the business account of the business customer and determine in block 212 to activate the invoice payment option for the business customer in a graphical user interface associated (e.g., embodying the shopping cart) with the e-commerce application based on the credit status of the business account and the determination that the item(s) (or a subset thereof) in the virtual shopping cart are approved for the invoice payment option.

By way of further example, in block 210, the activation module 124 may in some embodiments additionally or alternatively calculate a total purchase price for purchasing the one or more items in the virtual shopping cart. The business account data may include a plurality of business accounts associated with the business customer reflecting lines of credit associated with the business accounts, respectively. The business account data may further include a credit status for each of the business accounts reflecting whether that business account is current, and an available amount of credit in each of the business accounts. The activation module 124 may then determine to activate the invoice payment option by activating invoice payment options for each of the business accounts that has the credit status as being current and where the total purchase price does not exceed the available amount of credit for that business account. The e-commerce application 136 may then generate a graphical user interface that includes the activated payment options, as discussed elsewhere herein.

As a further example, the activation module 124 may determine to activate or deactivate invoice payment options by computing and/or retrieve a previously computed credit score and comparing the score to a credit threshold, comparing the data describing the credit limits of those accounts to the maximum credit thresholds for those accounts, analyze the data describing credit payment frequency (e.g., a Boolean, a payment date, etc.) to determine whether account payments have regularly been made within a certain period of time, determine the age of the business account and compare it to a minimum account-open threshold to determine if the business account has been open long enough, and/or analyze the account data for other suitable acceptable or unacceptable credit status indicators.

By way of further example, in block 210, the activation module 124 may in some embodiments additionally or alternatively dynamically determine a current spending rate associated with the business customer based on purchase data. The activation module 124 may retrieve the purchase data from the account database. The purchase data may reflects past purchases associated with the business account of the business customer. In determining whether to activate the invoice payment option for the business customer in the graphical user interface, the activation module 124 may perform a comparison between the current spending rate to a predefined spending threshold, and responsive to determining that the spending rate satisfies the spending threshold based on that comparison, the activation module 124 may determine to activate the invoice payment option for the business customer in the graphical user interface.

As with all examples and embodiments discussed herein, the above embodiments are intended to further illustrate various possible acts and/or features of the aspects disclosed hereby and are not meant to be exclusive or limiting unless specifically expressly stated as such.

Upon determining whether the invoice payment option should be activated, the activation module 124 may provide an activation signal to the cart module 122. The cart module 122 may then generate a summary of the items in the cart and payment options for purchasing the items in the cart. The payment options will include the invoice payment option if was activated by the activation module 124. The payment options may also include options for conventional forms of payment, such as by credit card, a payment service (e.g., PayPal™), etc.). In the event that the virtual shopping cart includes more than one item, and the invoice payment option was activated for only a subset of those items, than the payment options may include data specifying that the invoice payment option is activated for the subset or may exclude the invoice payment option for all items in the virtual shopping cart, depending on the configuration.

The web server 132 may generate a response to the cart request that includes the cart summary and the payment options and send the response to the client device 706 for rendering and presentation by the client application 138. In some embodiments, the response may be formatted using a web language (e.g., HTML, JSON, XML, JavaScript, etc.) and the client application 138 (e.g., a web browser, mobile app, etc.) may be configured to interpret and render the response in a graphical user interface. In some embodiments, some of the modules, or portions thereof, of the e-commerce application 136 may be code modules (e.g., JavaScript modules) that are transmitted by the web server 132 or another component of the system 700 to the client device 706 and may cooperatively render a corresponding graphical user interface with the client application 138. In further embodiments, the client-side instance of the e-commerce application 136 may exchange data (e.g., asynchronously) with the server-side instance of the e-commerce application 136, and may include and/or cooperate with the client application 138 to provide the selective invoice payment option acts and/or functionality discussed herein. Other embodiments are also possible and contemplated.

FIG. 2B is a flowchart of an example method 220 for providing a graphical user interface that includes the invoice payment option for display to a user. In block 222, the method 220 generates the graphical user interface including the invoice payment option and the summary of the virtual shopping cart, and in block 224, provides the graphical user interface including the invoice payment option and the summary of the virtual shopping cart for presentation on the client device associated with the business account of the business customer. In some embodiments, the interface module 120 may receive input provided by users, generate corresponding requests, and/or providing the requests to other components of the system 700, as discussed elsewhere herein.

Figure 3A:
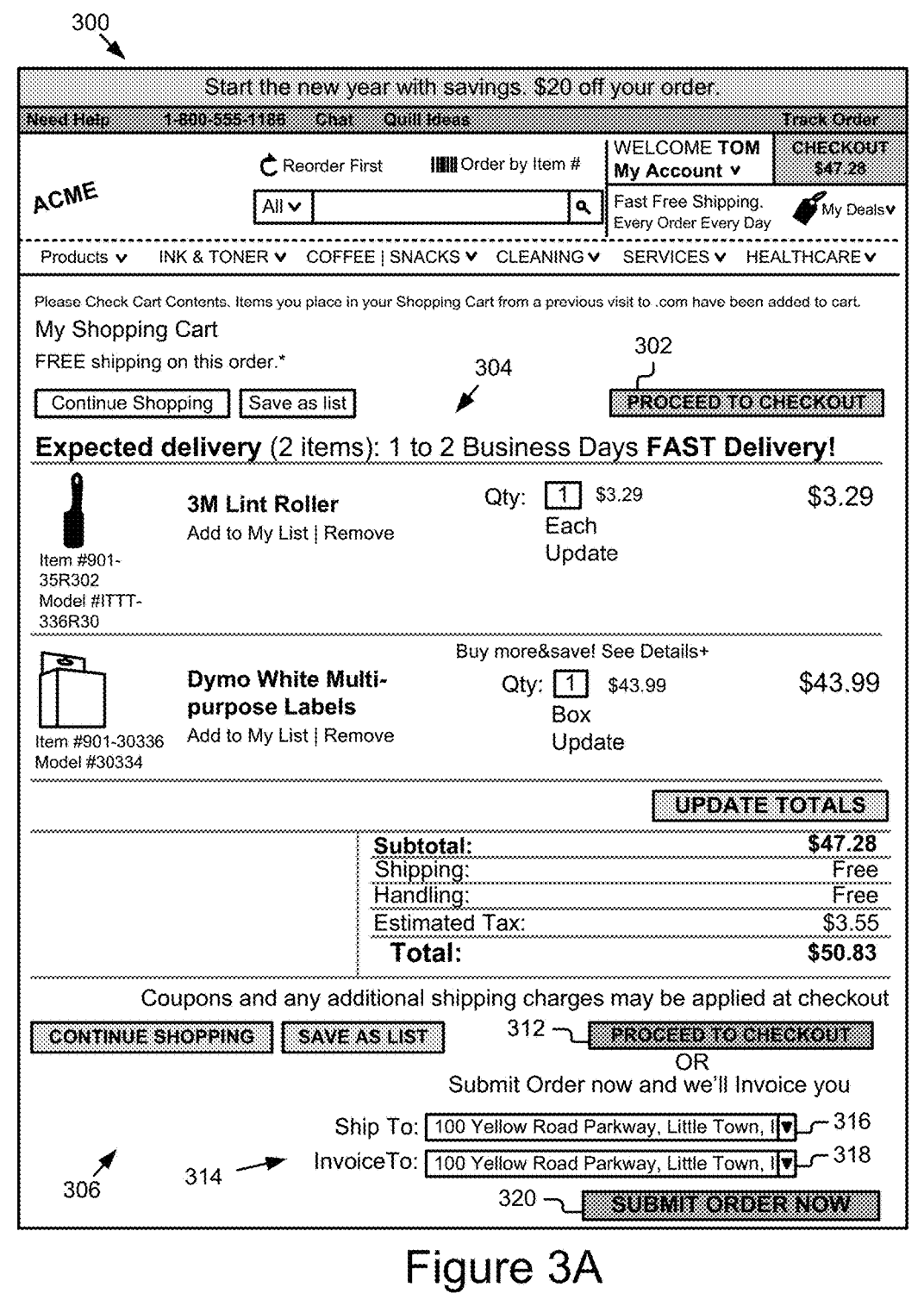

FIG. 3A is a graphical representation of an example graphical user interface 300 for selectively providing an invoice payment option. The version of the graphical user interface 300 in FIG. 3A includes an invoice payment option 314. The invoice payment option 314 may include one or more subaccounts that the user may select to invoice the order to. This is advantageous as larger businesses may have different divisions that manage accounting separately and the business user ordering items in the cart may use the element 318 (e.g., the drop-down menu) effect which specific subaccount the order should be invoice to. In some embodiments, the business account may include several subaccounts, and the activation module 124, when determining whether to activate the invoice option may determine which of the subaccounts should be activated for the invoice payment option for that specific user. Some users acting as delegates for a business may have different permission levels defining items they are permitted to order in which invoice accounts they are permitted to invoice the orders to. This information may be stored as business account data 144 in the account database 108 and may be retrieved by the activation module 124 and processed thereby to determine which specific accounts if any a current given user using the e-commerce application may invoice the order to.

In some embodiments, the graphical user interface 300 may include user interface elements allowing the user to associate certain items with certain invoiceable subaccounts. For example, the graphical user interface 300 may include a drop-down 318 for each element in the cart that is selectable by the user to individually associate each item of the corresponding invoiceable subaccount, although other variations are possible such as a variation where the user may drag-and-drop items into individual contextual regions associated with the different subaccounts to associate those items with the subaccounts, respectively. The user may place the order using the selected was more account by selecting the submit element 320, and responsive thereto, interface module 120 may receive the instruction and trigger the generation and submission of the order request to the e-commerce server 722.

In some embodiments, the graphical user interface 300 may include a separate element 316 (e.g., a drop down menu) for the user to indicate which address to ship the order to. The depicted example, the address associated with the invoice will subaccount is depicted as the default address in the element 316, although other variations are possible where a different delivery addresses is associated with the subaccount and is displayed by default. Shipping and invoicing addresses are stored as business account data 144 in the account database may be retrievable by the activation module 124 under other components for use thereby and inclusion in the graphical user interface 300.

The graphical user interface 300 may also include other information and user-selectable elements, such as an alternative option 302 to check out (e.g. using other payment options such as credit card), delivery information 304 about the delivery of the items in order, options 306 to manage the items in the cart, etc.

FIG. 2C is a flowchart of an example method 220 for providing a graphical user interface that includes a disabled invoice payment option for display to a user. In block 222, the method 220 generates the graphical user interface including the disabled invoice payment option and the summary of the virtual shopping cart. In some embodiments, generating the graphical user interface includes generating the interface to include any inactivated payment options reflecting any business accounts that have credit statuses as not being current and available amounts of credit that are less than the total purchase price, respectively. Other variations are also possible as discussed elsewhere herein.

In block 224, provides the graphical user interface including the disabled invoice payment option and the summary of the virtual shopping cart for presentation on the client device associated with the business account of the business customer. The inactivated payment options may be disabled for user selection in the interface or may simply not be included, depending on the implementation.

In some embodiments, the cart module 122 may include instructions for performing these acts and/or may facilitate other components to do so (e.g., the client application 138).

FIG. 3A is also a graphical representation of the example graphical user interface 300 for selectively providing an invoice payment option. In comparison to FIG. 3A, in FIG. 3B, the element 318 is grayed out because the business account with which the user is associated does not qualify for invoicing, as indicated by text 322. In this particular example, the business account is comprised of multiple subaccounts (called invoice addresses in text 322) so the user may select another subaccount that may qualify using the element 318. Upon selecting a subaccount that does qualify for invoicing, the cart module 122, the interface module 120, or other components of the system may refresh the graphical user interface 300 display the element 318 is being activated instead of the activated (e.g., grayed out).

In further scenarios where the business account is comprised of a single account, the user may not be able to order the items using the invoice payment option may have to proceed to checkout using the form of payment such as a credit card.

Figure 4:
FIG. 4 is a graphical representation of an example graphical user interface excluding the invoice payment option because of a restricted item being included in a virtual shopping cart.

FIG. 4 is a graphical representation of an example graphical user interface 400 that excludes the invoice payment option (e.g., element 314 in FIGS. 3A and 3B) because of a restricted item 402 being included in a virtual shopping cart. In this version of the interface 400, the user can proceed to order the items in the cart using other forms of payment (e.g., by selecting element 404).

Figure 6:
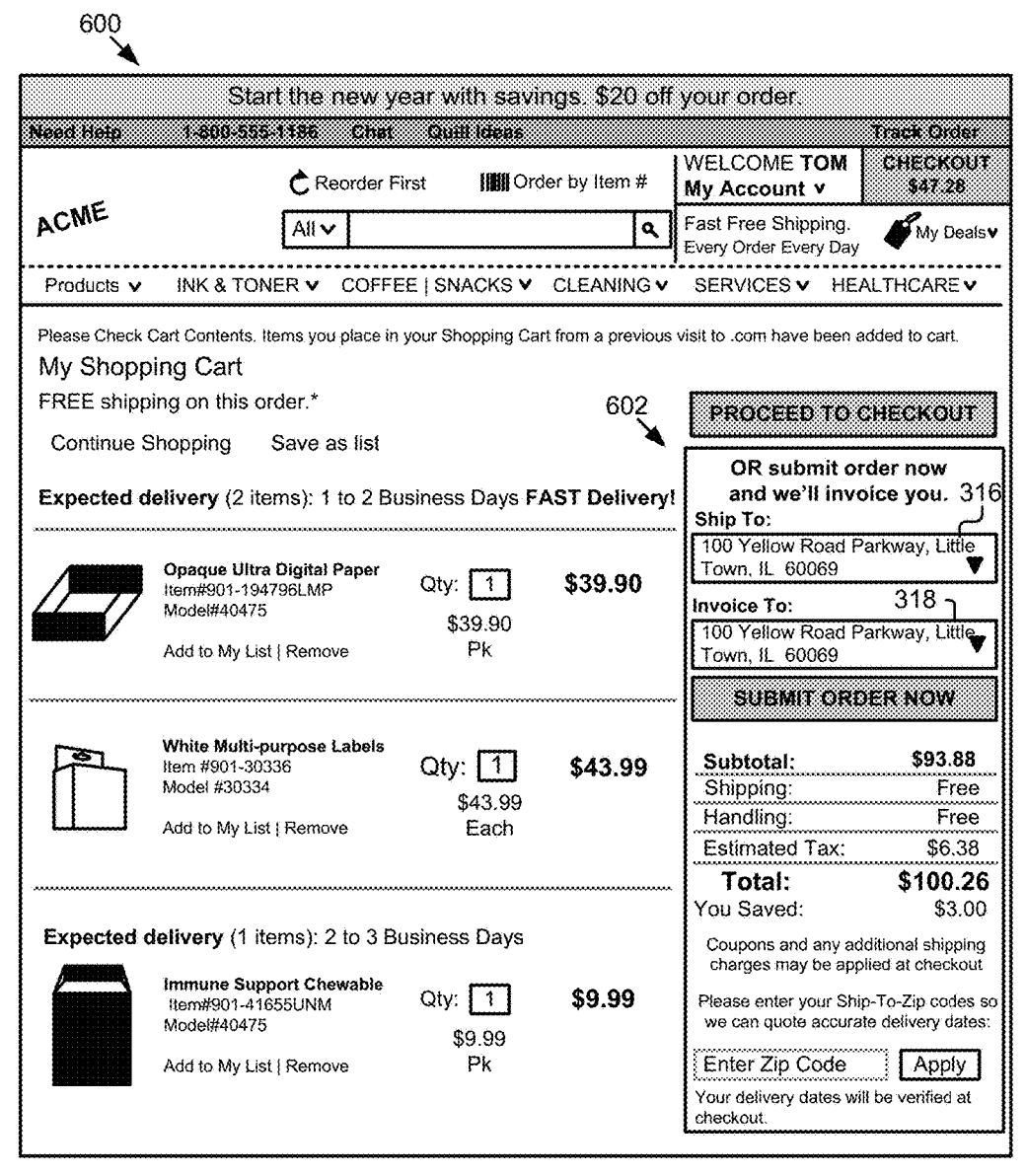

FIG. 6 is a graphical representation of another example graphical user interface 600 selectively providing an invoice payment option. In this variation, the interface 600 includes an order region 602 that is sticky, meaning as the user scrolls down the page the order region 604 remains in a prominent position on the page to further encourage the user to complete your submission process. In other solutions, as the user scrolls down the page the order button may disappear from view in the user is required to scroll all of the way back up the page in order to access the order. For users that are "on the fence" about the purchase, having the order button out of view can factor into the user to abandoning the cart. Fixing the position of the order region 602 on the page so it remains stationary during scrolling or limiting its movement to within a certain predefined bounding region (substantially fixing the position of the order region 602), during scrolling makes the order region 602 persistently visible to the user regardless of where the user is on the page. The cart module 122 or another component of the system 700 (e.g., the client application 138) may include the computer executable instructions for fixing/substantially fixing the position of the order region 602 on the screen of the client device 706. As shown, the order region 602 may include the elements 316 and/or 318 as discussed above with reference to at least FIGS. 3A and 3B.

Further methods may include a method for facilitating the purchase and fulfillment of an item. For instance, the order module 126 of the e-commerce application 136 may receive an order request associated with the client device authenticated using the user profile of the business customer on the e-commerce application. The order request may request submission of an order for the one or more items in the virtual shopping cart using an invoice payment option. In some embodiments, the web server 134 may initially receive the order request, parse it, and signal the order module 122 to process it. The order module 126 may process the order of the one or more items in the virtual shopping cart by charging the business account associated with the business account of the business customer, sending an invoice to the business customer requesting payment for the order, and submitting the order to a fulfillment system.

In sending the invoice, the order module 122 may dispatch a request to an accounting system associated with the e-commerce server 722 that includes the requisite information to generate the invoice. The accounting system may then send the invoice electronically or via post to the business customer, who may then pay the invoice using conventional payment methods.

Upon verifying the invoice payment option and instructing the invoice to be dispatched, or upon processing the payment using conventional payment methods, the order module 126 may place the order for the item. For instance, the e-commerce application 136 authorizes the order for fulfillment, by storing record of such (e.g., purchase data 146) in the database(s) 108. A fulfillment system associated with the e-commerce application 612 may facilitate delivery of the order to the user (e.g., by sending the order to an order fulfillment facility for shipment/delivery, a local store for in-store pickup, etc.).

Responsive to successfully processing the order, the order module 126 may generate and provide an order confirmation graphical user interface for display to the user. FIG. 5 is a graphical representation of an example graphical user interface 500 of a confirmation page that confirms an order submission using invoice payment option. The interface 500 includes order information 502 describing the order date (e.g., Jan. 6, 2015), the business customer information (e.g., of Business X), an order number (e.g., 56447757), billing information, and delivery information. The billing information includes a confirmation 504 that the method of payment that was used was the invoice payment option.

FIG. 7 is a block diagram of an example system 700 for dynamically, selectively providing an invoice payment option. The illustrated system 700 may include a client device 706a . . . 706n (also referred to herein individually and/or collectively as 706), a third-party server 718, and an e-commerce server 722, which are electronically communicatively coupled via a network 702 for interaction with one another, although other system configurations are possible including other devices, systems, and networks. For example, the system 700 could include any number of client devices 706, third-party servers 718, e-commerce servers 722, and other systems and devices. The client devices 706a . . . 706n, and their components, may be coupled to the network 702 via signal lines 712a . . . 712n. The e-commerce server 722 and its components may be coupled to the network 702 via signal line 720. The third-party server 718 and its components may be coupled to the network 702 via signal line 716. The users 714a . . . 714n may access one or more of the devices of the system 700. For example, as depicted, a user 714a may access and/or interact with the client device 706a as illustrated by line 712a, a user 714b may access and/or interact with the client device 706b as illustrated by line 712b, and a user 714n may access and/or interact with the client device 706n as illustrated by line 110n.

The network 702 may include any number of networks and/or network types. For example, the network 702 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

A plurality of client devices 706a . . . 706n are depicted in FIG. 7 to indicate that the e-commerce server 722 and its components may services to a multiplicity of users 714a . . . 714n on a multiplicity of client devices 706a . . . 706n. In some implementations, a single user may use more than one client device 706, which the e-commerce server 722 may receive and manage data associated with the user and use to performs its acts and/or functions as discussed elsewhere herein.

The e-commerce server 722 and the third-party server 718 have data processing, storing, and communication capabilities, as discussed elsewhere herein. For example, the servers 722 and/or 718 may include one or more hardware servers, server arrays, storage devices and/or systems, etc. In some implementations, the servers 722 and/or 718 may include one or more virtual servers, which operate in a host server environment. As depicted, the e-commerce server 722 may include the e-commerce application 136 and the web server 134, as discussed elsewhere herein.

Third-party server 718 can host services such as a third-party application (not shown), which may be individual and/or incorporated into the services provided by the e-commerce server 722. In some implementations, the third-party application provides additional acts and/or information such as browsing history, tracking information, profile data, shopping data, web analytics, etc., to the e-commerce server 722 for storage in the database(s) 108.

It should be understood that the system 700 illustrated in FIG. 7 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method executable by one or more computing devices to selectively provide an invoice payment option in an e-commerce application, the method comprising:

receiving a cart request associated with a client device authenticated using a user profile of a business customer on an e-commerce application, the cart request requesting a summary of a virtual shopping cart including a first item and a second item added to the virtual shopping cart by the business customer using the e-commerce application;

responsive to receiving the cart request, retrieving, from an item database, item data describing a set of one or more attributes for each of the first item and the second item in the virtual shopping cart, performing a comparison between the set of attributes of each of the first item and the second item in the virtual shopping cart and a set of restricted attributes, and determining that the first item in the virtual shopping cart qualifies for the invoice payment option and that the second item in the virtual shopping cart does not qualify for the invoice payment option based on the comparison;

retrieving, from an account database, business account data including a credit status of a business account of the business customer and an available amount of credit in the business account of the business customer;

responsive to a determination that the first item in the virtual shopping cart qualifies for the invoice payment option and that the second item in the virtual shopping cart does not qualify for the invoice payment option based on the comparison between the set of attributes of each of the first item and the second item in the virtual shopping cart and the set of restricted attributes, determining to activate the invoice payment option for the first item for the business customer in a graphical user interface associated with the e-commerce application based on the credit status of the business account, and determining to inactivate the invoice payment option for the second item in the graphical user interface associated with the e-commerce application;

generating the graphical user interface including the summary of the virtual shopping cart, the graphical user interface enabling the invoice payment option for the first item and disabling the invoice payment option for the second item; and providing the graphical user interface for presentation on the client device associated with the business account of the business customer.

2. The computer-implemented method of claim 1, further comprising:

calculating a purchase price for purchasing the first item in the virtual shopping cart, wherein the business account data includes a plurality of business accounts associated with the business customer reflecting lines of credit associated with the business accounts, respectively, the business account data further including a credit status for each business account of the plurality reflecting whether that business account is current, and an available amount of credit in each business account of the plurality, determining to activate the invoice payment option for the first item includes activating invoice payment options for the first item for each of the business accounts of the plurality that has the credit status as being current and where the purchase price for purchasing the first item does not exceed the available amount of credit for that business account, and generating the graphical user interface includes generating the graphical user interface to include the activated invoice payment options.

3. The computer-implemented method of claim 1, wherein generating the graphical user interface includes generating the graphical user interface to include any inactivated invoice payment options for the first item reflecting any business accounts that have credit statuses as not being current and available amounts of credit that are less than a purchase price for purchasing the first item, respectively, the inactivated invoice payment options being disabled for user selection in the graphical user interface.

4. The computer-implemented method of claim 1, further comprising:

receiving an order request associated with the client device authenticated using the user profile of the business customer on the e-commerce application, the order request requesting submission of an order for the first item in the virtual shopping cart using the invoice payment option; and processing the order of the first item in the virtual shopping cart by charging the business account of the business customer, sending an invoice to the business customer requesting payment for the order, and submitting the order to a fulfillment system.

5. The computer-implemented method of claim 1, wherein determining to activate the invoice payment option for the first item for the business customer in the graphical user interface is further based on one or more of an employee count of a business associated with the business customer, a size of the business, and a type of the business.

6. The computer-implemented method of claim 1, further comprising:

retrieving purchase data from the account database reflecting past purchases associated with the business account of the business customer; and dynamically determining a current spending rate associated with the business customer based on purchase data, wherein determining to activate the invoice payment option for the first item for the business customer in the graphical user interface includes performing a comparison between the current spending rate to a predefined spending threshold, and responsive to determining that the current spending rate satisfies the predefined spending threshold based on the comparison between the current spending rate to the predefined spending threshold, determining to activate the invoice payment option for the first item for the business customer in the graphical user interface.

7. The computer-implemented method of claim 1, wherein the item data includes shipping data having one or more shipping criteria for each of the first item and the second item, and performing the comparison between the set of attributes of each of the first item and the second item in the virtual shopping cart and the set of restricted attributes includes:

comparing the one or more shipping criteria of each of the first item and the second item to one or more restricted shipping options included in the set of restricted attributes, determining that the first item does not require any of the one or more restricted shipping options, and responsive to determining that the first item does not require any of the one or more restricted shipping options, determining that the first item in the virtual shopping cart qualifies for the invoice payment option based on the comparison.

8. The computer-implemented method of claim 1, wherein the item data includes category data having a category for each of the first item and the second item, and performing the comparison between the set of attributes of each of the first item and the second item in the virtual shopping cart and the set of restricted attributes includes:

comparing the category of each of the first item and the second item to a list of restricted categories, determining that the first item does not belong to one or more categories included in the list of restricted categories, and responsive to determining that the first item does not belong to the one or more categories included in the list of restricted categories, determining that the first item in the virtual shopping cart qualifies for the invoice payment option based on the comparison.

9. A computing system comprising:

one or more processors; and one or more memories storing instructions that, when executed by the one or more processors, cause the computing system to perform acts including:

receiving a cart request associated with a client device authenticated using a user profile of a business customer on an e-commerce application, the cart request requesting a summary of a virtual shopping cart including a first item and a second item added to the virtual shopping cart by the business customer using the e-commerce application;

responsive to receiving the cart request, retrieving, from an item database, item data describing a set of one or more attributes for each of the first item and the second item in the virtual shopping cart, performing a comparison between the set of attributes of each of the first item and the second item in the virtual shopping cart and a set of restricted attributes, and determining that the first item in the virtual shopping cart qualifies for an invoice payment option and that the second item in the virtual shopping cart does not qualify for the invoice payment option based on the comparison;

retrieving, from an account database, business account data including a credit status of a business account of the business customer and an available amount of credit in the business account of the business customer;

responsive to a determination that the first item in the virtual shopping cart qualifies for the invoice payment option and that the second item in the virtual shopping cart does not qualify for the invoice payment option based on the comparison between the set of attributes of each of the first item and the second item in the virtual shopping cart and the set of restricted attributes, determining to activate the invoice payment option for the first item for the business customer in a graphical user interface associated with the e-commerce application based on the credit status of the business account, and determining to inactivate the invoice payment option for the second item in the graphical user interface associated with the e-commerce application;

generating the graphical user interface including the summary of the virtual shopping cart, the graphical user interface enabling the invoice payment option for the first item and disabling the invoice payment option for the second item; and providing the graphical user interface for presentation on the client device associated with the business account of the business customer.

10. The computing system of claim 9, wherein the instructions, when executed by the one or more processors, further cause the computing system to perform acts including:

calculating a purchase price for purchasing the first item in the virtual shopping cart, wherein the business account data includes a plurality of business accounts associated with the business customer reflecting lines of credit associated with the business accounts, respectively, the business account data further including a credit status for each business account of the plurality reflecting whether that business account is current, and an available amount of credit in each business account of the plurality, determining to activate the invoice payment option for the first item includes activating invoice payment options for the first item for each of the business accounts of the plurality that has the credit status as being current and where the purchase price for purchasing the first item does not exceed the available amount of credit for that business account, and generating the graphical user interface includes generating the graphical user interface to include the activated invoice payment options.

11. The computing system of claim 9, wherein generating the graphical user interface includes generating the graphical user interface to include any inactivated invoice payment options for the first item reflecting any business accounts that have credit statuses as not being current and available amounts of credit that are less than a purchase price for purchasing the first item, respectively, the inactivated invoice payment options being disabled for user selection in the graphical user interface.

12. The computing system of claim 9, wherein the instructions, when executed by the one or more processors, further cause the computing system to perform acts including:

receiving an order request associated with the client device authenticated using the user profile of the business customer on the e-commerce application, the order request requesting submission of an order for the first item in the virtual shopping cart using the invoice payment option; and processing the order of the first item in the virtual shopping cart by charging the business account of the business customer, sending an invoice to the business customer requesting payment for the order, and submitting the order to a fulfillment system.

13. The computing system of claim 9, wherein determining to activate the invoice payment option for the first item for the business customer in the graphical user interface is further based on one or more of an employee count of a business associated with the business customer, a size of the business, and a type of the business.

14. The computing system of claim 9, wherein the instructions, when executed by the one or more processors, further cause the computing system to perform acts including:

retrieving purchase data from the account database reflecting past purchases associated with the business account of the business customer; and dynamically determining a current spending rate associated with the business customer based on purchase data, wherein determining to activate the invoice payment option for the first item for the business customer in the graphical user interface includes performing a comparison between the current spending rate to a predefined spending threshold, and responsive to determining that the current spending rate satisfies the predefined spending threshold based on the comparison between the current spending rate to the predefined spending threshold, determining to activate the invoice payment option for the first item for the business customer in the graphical user interface.

15. The computing system of claim 9, wherein the item data includes shipping data having one or more shipping criteria for each of the first item and the second item, and performing the comparison between the set of attributes of each of the first item and the second item in the virtual shopping cart and the set of restricted attributes includes:

comparing the one or more shipping criteria of each of the first item and the second item to one or more restricted shipping options included in the set of restricted attributes, determining that the first item does not require any of the one or more restricted shipping options, and responsive to determining that the first item does not require any of the one or more restricted shipping options, determining that the first item in the virtual shopping cart qualifies for the invoice payment option based on the comparison.

16. The computing system of claim 9, wherein the item data includes category data having a category for each of the first item and the second item, and performing the comparison between the set of attributes of each of the first item and the second item in the virtual shopping cart and the set of restricted attributes includes:

comparing the category of each of the first item and the second item to a list of restricted categories, determining that the first item does not belong to one or more categories included in the list of restricted categories, and responsive to determining that the first item does not belong to the one or more categories included in the list of restricted categories, determining that the first item in the virtual shopping cart qualifies for the invoice payment option based on the comparison.

* * * * *